US010948331B2

(12) United States Patent
Horne et al.

(10) Patent No.: US 10,948,331 B2
(45) Date of Patent: Mar. 16, 2021

(54) CAPACITIVE SENSING SYSTEM AND RELATED METHOD

(71) Applicant: Electrolux Home Products, Inc., Charlotte, NC (US)

(72) Inventors: George Marshall Horne, Kannapolis, NC (US); Thomas Josefsson, Concord, NC (US); Stephen Smith, Waxhaw, NC (US); Paul Stoufer, Lincolnton, NC (US); Vasantha Chitta, Huntersville, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 172 days.

(21) Appl. No.: 16/182,132

(22) Filed: Nov. 6, 2018

(65) Prior Publication Data

US 2020/0141788 A1    May 7, 2020

(51) Int. Cl.
*G01F 23/26* (2006.01)

(52) U.S. Cl.
CPC .......... *G01F 23/266* (2013.01); *G01F 23/265* (2013.01); *G01F 23/268* (2013.01)

(58) Field of Classification Search
CPC ...... G01F 23/26; G01F 23/261; G01F 23/263; G01F 23/265; G01F 23/266; G01F 23/268
See application file for complete search history.

(56) References Cited

U.S. PATENT DOCUMENTS

| 4,423,628 | A | * | 1/1984 | Richter | G01F 23/26 73/290 R |
|---|---|---|---|---|---|
| 5,017,909 | A | | 5/1991 | Goekler | |
| 5,394,748 | A | | 3/1995 | McCarthy | |
| 7,143,588 | B2 | | 12/2006 | Cole | |
| 8,151,596 | B2 | | 4/2012 | Richmond et al. | |
| 8,380,355 | B2 | * | 2/2013 | Mayleben | G01F 23/266 700/282 |
| 8,434,321 | B2 | | 5/2013 | Kim | |
| 8,484,987 | B2 | | 7/2013 | Ducharme et al. | |
| 9,032,746 | B2 | | 5/2015 | Ito et al. | |
| 9,057,556 | B2 | | 6/2015 | Ashrafzadeh et al. | |

(Continued)

FOREIGN PATENT DOCUMENTS

| CN | 201765028 | 3/2011 |
|---|---|---|
| KR | 2010054489 | 5/2010 |
| WO | WO 2015/113827 | 8/2015 |

*Primary Examiner* — Justin N Olamit
(74) *Attorney, Agent, or Firm* — Womble Bond Dickinson (US) LLP

(57) ABSTRACT

A capacitive sensing system may include a fluid cup configured to receive a fluid, and processing circuitry and a capacitive sensor coupled to one another, the capacitive sensor is a distance separated from and in parallel with a top surface of the fluid in the fluid cup, the distance the capacitive sensor is separated from the top surface of the fluid being variable with a fill level of the fluid in the fluid cup. The capacitive sensor and the fluid in the fluid cup may form elements of a capacitor with a capacitance that is a function of at least the distance the capacitive sensor is separated from the top surface of the fluid. The processing circuitry may be configured to measure a change in signal corresponding to a change in capacitance of the capacitor and determine the fill level based on a magnitude of the change in signal.

14 Claims, 5 Drawing Sheets

(56) References Cited

U.S. PATENT DOCUMENTS

| | | | |
|---|---|---|---|
| 9,543,674 B2* | 1/2017 | Wuerstlein | H01R 12/7076 |
| 2006/0201170 A1 | 9/2006 | Cole | |
| 2007/0254084 A1* | 11/2007 | Cocchi | G01F 23/2845 |
| | | | 426/565 |
| 2012/0290227 A1 | 11/2012 | Estrada | |
| 2017/0370628 A1 | 12/2017 | Knatt | |

\* cited by examiner

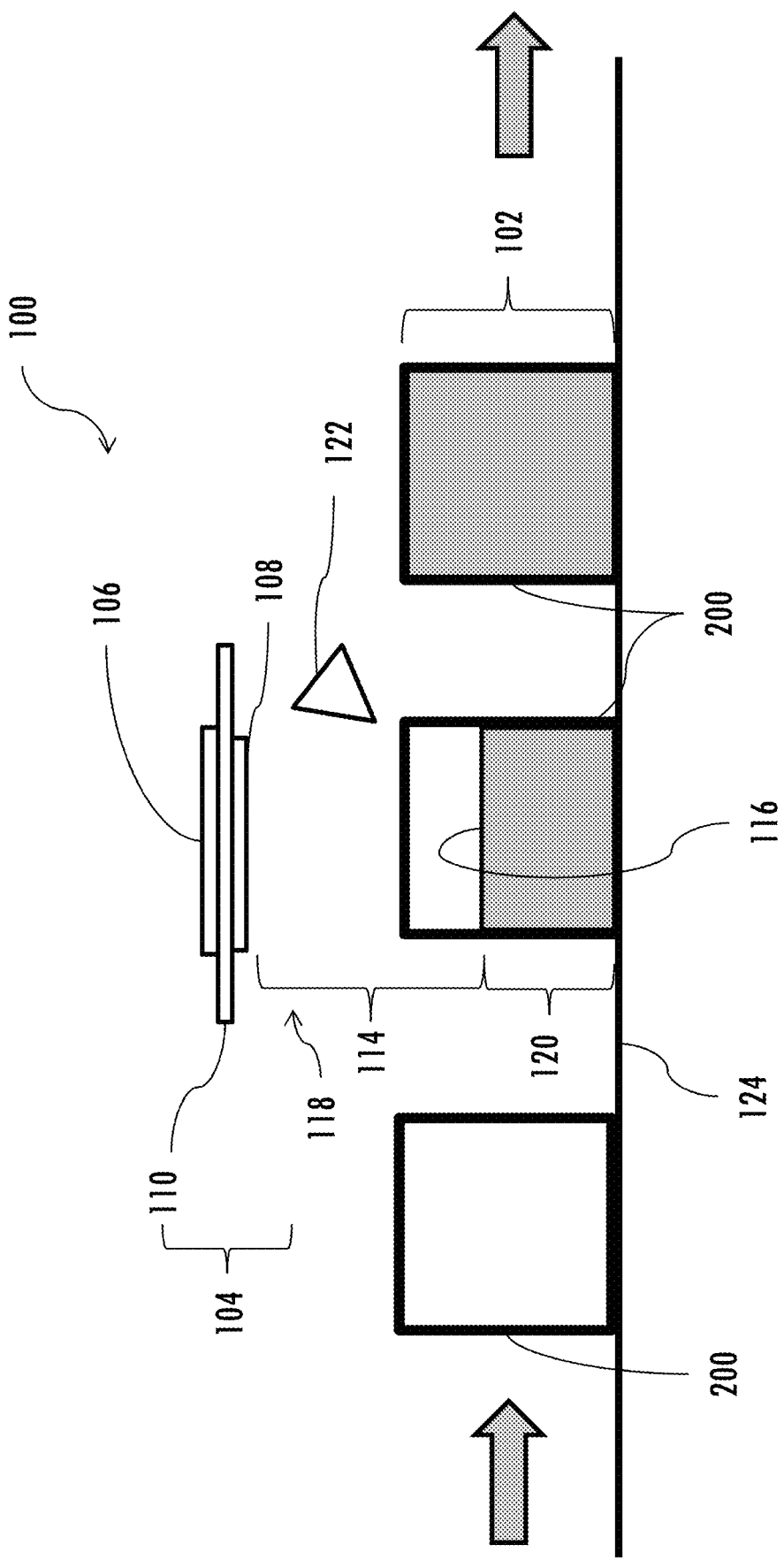

302 — MOVING A FLUID CUP INTO ALIGNMENT WITH A CAPACITIVE SENSOR OF A CAPACITIVE SENSING CIRCUIT

304 — RECEIVING A FLUID IN THE FLUID CUP SUCH THAT THE CAPACITIVE SENSOR IS A DISTANCE SEPARATED FROM AND IN PARALLEL WITH A TOP SURFACE OF THE FLUID IN THE FLUID CUP, THE DISTANCE THE CAPACITIVE SENSOR IS SEPARATED FROM THE TOP SURFACE OF THE FLUID BEING VARIABLE WITH A FILL LEVEL OF THE FLUID IN THE FLUID CUP, WHEREIN THE CAPACITIVE SENSOR AND THE FLUID IN THE FLUID CUP FORM ELEMENTS OF A CAPACITOR WITH A CAPACITANCE THAT IS A FUNCTION OF AT LEAST THE DISTANCE THE CAPACITIVE SENSOR IS SEPARATED FROM THE TOP SURFACE OF THE FLUID, THE CAPACITANCE BEING VARIABLE WITH THE DISTANCE AND THEREBY THE FILL LEVEL OF THE FLUID IN THE FLUID CUP

306 — MEASURING A CHANGE IN SIGNAL CORRESPONDING TO THE CHANGE IN CAPACITANCE OF THE CAPACITOR AS THE FILL LEVEL OF THE FLUID IN THE FLUID CUP CHANGES

308 — DETERMINING THE FILL LEVEL OF THE FLUID IN THE FLUID CUP BASED ON A MAGNITUDE OF THE CHANGE IN SIGNAL

CAPACITIVE SENSING SYSTEM AND RELATED METHOD

TECHNOLOGICAL FIELD

The present disclosure relates generally to fluid level detection in a solid-production system and, in particular, to a capacitive sensing system and related method for fluid level detection in a solid-production system.

BACKGROUND OF THE DISCLOSURE

Solid-production systems, such as consumer ice-makers, typically employ a sensing mechanism in conjunction with a dispensing apparatus to automatically determine a fill level of fluid dispensed from the dispensing apparatus.

For example, a capacitive sensor may be provided adjacent to a compartment of the fluid tray, but external to the fluid, such that the capacitive sensor is not submerged in the fluid. The capacitive sensor may comprise a non-conductive, dielectric substrate that conforms to the exterior of the compartment of the fluid tray. A plurality of electrodes may extend along a longitudinal axis of the substrate. An electrode of the plurality of electrodes may transmit a signal corresponding to dielectric changes in the electrode as the fill level of the fluid changes within the compartment of the fluid tray. The fill level of the fluid can then be determined based on the physical location of the transmitting electrode on the compartment up to a predetermined threshold fill level. A controller may be configured to close a valve in the dispensing apparatus in response to a determination that the predetermined threshold fill level is achieved. However, providing a sensor adjacent to the compartment of the fluid tray in this manner is problematic as the sensor may be measuring the sides of the compartment of the fluid tray, which does not take into account surface tension such that the fill level may be higher at the sides of the compartment than in the center. As such, some compartments may be filled inconsistently due to inaccurate determination of the fill level of the fluid across the whole compartment.

Accordingly, it may be desirable to utilize a capacitive sensing system and a related method that utilizes a capacitive sensing circuit that is a distance separated from and substantially in parallel with a top surface of fluid in a fluid tray, a fluid mold, a fluid cup, and the like, so as to detect a fill level of the fluid, such as water.

SUMMARY

Example implementations of the present disclosure are directed to a capacitive sensing system and related method for determining a fill level of a fluid in a fluid cup, in for example, a solid-production system. The present disclosure includes, without limitation, the following example implementations.

Some example implementations provide a capacitive sensing system comprising a fluid cup configured to receive a fluid; and a capacitive sensing circuit including processing circuitry and a capacitive sensor coupled to one another, the fluid cup being movably aligned with the capacitive sensor such that the capacitive sensor is a distance separated from and in parallel with a top surface of the fluid in the fluid cup, the distance the capacitive sensor is separated from the top surface of the fluid being variable with a fill level of the fluid in the fluid cup, wherein the capacitive sensor and the fluid in the fluid cup form elements of a capacitor with a capacitance that is a function of at least the distance the capacitive sensor is separated from the top surface of the fluid, the capacitance being variable with the distance and thereby the fill level of the fluid in the fluid cup, wherein the processing circuitry is configured to measure a change in signal corresponding to a change in capacitance of the capacitor as the fill level of the fluid in the fluid cup changes, and determine the fill level of the fluid in the fluid cup based on a magnitude of the change in signal.

In some example implementations of the capacitive sensing system of any preceding example implementation, or any combination of any preceding example implementations, the capacitive sensing system further comprises a circuit board on which the processing circuitry is provided.

In some example implementations of the capacitive sensing system of any preceding example implementation, or any combination of any preceding example implementations, the capacitive sensor comprises a sensor pad electrically coupled to the processing circuitry.

In some example implementations of the capacitive sensing system of any preceding example implementation, or any combination of any preceding example implementations, the capacitive sensing system further comprises an electrical conductor electrically connected to and between the sensor pad and the circuit board, the electrical conductor configured to position the sensor pad in a spaced apart relation to the circuit board and aligned with the fluid cup, the electrical conductor comprising a conductive wire, standoff or spring.

In some example implementations of the capacitive sensing system of any preceding example implementation, or any combination of any preceding example implementations, the fluid cup or another element of the capacitive sensing system is made from a conductive material or has the conductive material affixed thereto, the conductive material being electrically connected to a circuit common on the circuit board to thereby ground the fluid cup or the other element of the capacitive sensing system In some example implementations of the capacitive sensing system of any preceding example implementation, or any combination of any preceding example implementations, the sensor pad and the fluid cup or the other element of the capacitive sensing system form respective plates of the capacitor.

In some example implementations of the capacitive sensing system of any preceding example implementation, or any combination of any preceding example implementations, the sensor pad is provided on the circuit board to form one plate of the capacitor.

In some example implementations of the capacitive sensing system of any preceding example implementation, or any combination of any preceding example implementations, the other element of the capacitive sensing system comprises at least a cooling block made from the conductive material or having the conductive material affixed thereto.

In some example implementations of the capacitive sensing system of any preceding example implementation, or any combination of any preceding example implementations, the capacitive sensing system further comprises a dispensing nozzle in a spaced apart relation to the capacitive sensor, the fluid cup also being movably aligned with the dispensing nozzle that is configured to dispense the fluid into the fluid cup.

In some example implementations of the capacitive sensing system of any preceding example implementation, or any combination of any preceding example implementations, the processing circuitry is configured to cause the dispensing nozzle to dispense the fluid into the fluid cup until the processing circuitry measures the change in signal having the magnitude that is the same as a predetermined threshold magnitude of the change in signal, such that the fill level of the fluid in the fluid cup is at a predetermined threshold fill level.

In some example implementations of the capacitive sensing system of any preceding example implementation, or any combination of any preceding example implementations, the capacitive sensing system further comprises an actuator configured to move the fluid cup out of alignment with the capacitive sensor and the dispensing nozzle and move a subsequent fluid cup into alignment with the capacitive sensor and the dispensing nozzle after the fill level of the fluid in the fluid cup is at the predetermined threshold fill level.

In some example implementations of the capacitive sensing system of any preceding example implementation, or any combination of any preceding example implementations, the capacitive sensor and the top surface of the fluid in the fluid cup have respective, matching surface areas.

Some example implementations provide a method for capacitive sensing comprising moving a fluid cup into alignment with a capacitive sensor of a capacitive sensing circuit; receiving a fluid in the fluid cup such that the capacitive sensor is a distance separated from and in parallel with a top surface of the fluid in the fluid cup, the distance the capacitive sensor is separated from the top surface of the fluid being variable with a fill level of the fluid in the fluid cup, wherein the capacitive sensor and the fluid in the fluid cup form elements of a capacitor with a capacitance that is a function of at least the distance the capacitive sensor is separated from the top surface of the fluid, the capacitance being variable with the distance and thereby the fill level of the fluid in the fluid cup; measuring a change in signal corresponding to a change in capacitance of the capacitor as the fill level of the fluid in the fluid cup changes; and determining the fill level of the fluid in the fluid cup based on a magnitude of the change in signal.

In some example implementations of the method for capacitive sensing of any preceding example implementation, or any combination of any preceding example implementations, the method for capacitive sensing further comprises moving the fluid cup into alignment with the capacitive sensor and a dispensing nozzle in a spaced apart relation to the capacitive sensor, and receiving the fluid in the fluid cup comprises dispensing the fluid from the dispensing nozzle into the fluid cup.

In some example implementations of the method for capacitive sensing of any preceding example implementation, or any combination of any preceding example implementations, the method for capacitive sensing further comprises the dispensing nozzle dispensing the fluid into the fluid cup until the change in signal is measured with the magnitude that is the same as a predetermined threshold magnitude of the change in signal, such that the fill level of the fluid in the fluid cup is at a threshold fill level.

In some example implementations of the method for capacitive sensing of any preceding example implementation, or any combination of any preceding example implementations, the method for capacitive sensing further comprises moving the fluid cup out of alignment with the capacitive sensor and the dispensing nozzle and moving a subsequent fluid cup into alignment with the capacitive sensor and the dispensing nozzle after the fill level of the fluid in the fluid cup is at the predetermined threshold fill level.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1A illustrates an example schematic of a capacitive sensing system according to example implementations of the present disclosure;

FIG. 4 illustrates an example flow diagram for a method for capacitive sensing according to example implementations of the present disclosure.

DETAILED DESCRIPTION

Figure 1B:
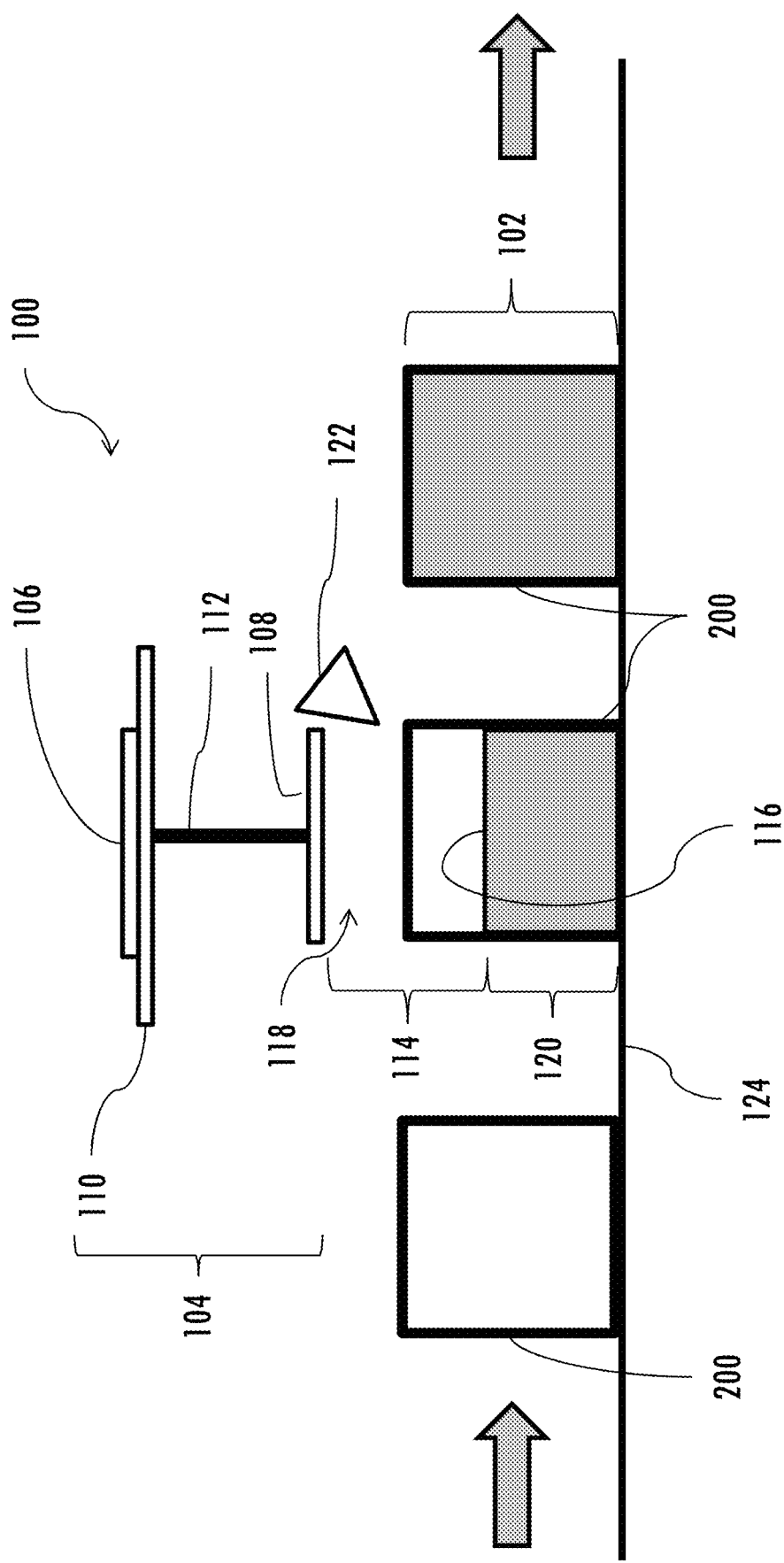
FIG. 1B illustrates an example schematic of a capacitive sensing system according to other example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to a capacitive sensing system and related method. The capacitive sensing system may include a circuit board on which processing circuitry is provided and a capacitive sensor coupled to the processing circuitry. The capacitive sensor may be moveably aligned with a top surface of fluid in a fluid cup so that the capacitive sensor and the fluid in the fluid cup form elements of a capacitor, such that the processing circuitry is able to measure a change in signal corresponding to a change in capacitance of the capacitive sensing system. As such, a fluid fill level of the fluid in the fluid cup may be determined based on a magnitude of the change in signal.

The capacitive sensing system disclosed herein may be advantageous as it may allow a fluid tray, a fluid mold, a fluid cup, and the like collectively referred to herein as "the fluid cup") to be precisely filled to a predetermined threshold fill level independent of fluid pressure. More particularly, the capacitive sensing system is configured to determine the fill level of the fluid in the fluid cup based on a magnitude of the change in signal, the change in signal being measured as the fill level of the fluid in the fluid cup changes. As such, the change in signal may correspond to a change in capacitance of the capacitor. In this manner, the fluid may be filled to the predetermined threshold fill level, regardless of a length of time needed to fill the fluid cup (e.g., where only fluid pressure is relied on) and/or fluid pressure.

Utilizing the capacitive sensing system disclosed herein may eliminate any problems associated with relying on fluid pressure to determine the fill level of fluid in the fluid cup, such as prematurely stopping fill of fluid in the fluid cup when fluid pressure is too low or overfilling the fluid cup with fluid when the fluid pressure is too high. Indeed, the capacitive sensing system disclosed herein may enable a solid-production system utilizing the capacitive sensing system disclosed herein to operate over a wider pressure range, as fluid pressure does not affect the system. Additionally, the capacitive sensing system also may eliminate the need for manually adjusting the fluid pressure to account for low or high pressure fluid dispensing.

The capacitive sensing system may also be advantageous as it may enable immediate determination of the fill level of fluid in a fluid cup. In this manner, in the case of a power outage, the capacitive sensing system may be able to, after powering back on, either continue filling the fluid cup up to a predetermined threshold fill level or, in the case of individual fluid cups, move a subsequent fluid cup into alignment with a dispensing nozzle. By contrast, after a power outage, typical solid-production systems that do not utilize a capacitive sensing system to measure the fill level of fluid in a fluid cup as disclosed herein, may require all the fluid cups to emptied (e.g., any solid in the fluid cups be dispensed) before filling the fluid cups or may assume that each of the fluid cups are already full, although they may not be, and go through a complete solidification cycle without producing a solid. Thus, it may take a longer period of time for a typical solid-production system to have a solid ready for a user/consumer after a power outage, as compared to a solid-production system utilizing the capacitive sensing system disclosed herein.

FIGS. 1A and 1B each illustrate a capacitive sensing system 100 according to example implementations of the present disclosure. The capacitive sensing system in each of FIGS. 1A and 1B may be utilized in any number of different types of applications such as food storage and processing, chemical manufacturing, concrete mixing and curing, consumer or packaged ice production, and the like. In some example implementations, the present disclosure may be suitable for use in a solid-production system, such as a consumer refrigeration system, where solid production is requested on demand by the consumer or user.

As shown in FIGS. 1A and 1B, the capacitive sensing system 100 includes a fluid cup 200 configured to receive a fluid. As used herein, the "fluid cup" may comprise a mold that is able to receive and contain fluid therein. The fluid cup may include a single, discrete fluid cup or may be a fluid tray or mold in which there are a plurality of individual fluid cups arranged adjacent to one another. In some example implementations, the fluid cup may be sized and/or shaped to receive at least a predetermined threshold fill level 102 of fluid therein. For example, the fluid cup may be cubical, rectangular, cylindrical, conical, or the like.

In some example implementations, the capacitive sensing system 100 further includes a capacitive sensing circuit 104 including processing circuitry 106 and a capacitive sensor 108 coupled to one another. The processing circuitry may, in some example implementations, be electrically coupled or connected to a circuit board 110. In some examples, the processing circuitry includes electronic components configured to perform data processing, application execution or other suitable functions. The processing circuitry may include a collection of electronic circuits some of which may be packaged as an integrated circuit or multiple interconnected integrated circuits (an integrated circuit at times more commonly referred to as a "chip"). In various examples, the processing circuitry includes one or more processors each of which may be embodied as or otherwise include a processor core, a microprocessor, a coprocessor, a controller, a microcontroller, an application-specific integrated circuit (ASIC), a field-programmable gate array (FPGA), or the like. In some examples, the processing circuitry includes memory coupled to or integrated with the processor, and which may store data, computer program instructions executable by the processor, and the like.

The electronic components may be provided on the circuit board 110 so that they are electrically coupled or otherwise connected to the processing circuitry 106. For example, the electronic components may be surfaced mounted to the circuit board, or provided via through-holes. In some example implementations, the capacitive sensor 108 may comprise a sensor pad electrically coupled to the processing circuitry. As illustrated in FIG. 1A, the sensor pad may comprise a conductive pad having an opposed surface in direct contact with and electrically coupled to (e.g., surface mounted or via through-holes) a first surface of the circuit board.

The sensor pad of the capacitive sensor 108 may also be electrically connected or otherwise coupled to the processing circuitry 106 via one or more electrical connections associated therewith. In some example implementations, and as illustrated in FIG. 1B, an electrical conductor 112 electrically connected to and between the sensor pad and the circuit board 110 may be utilized to electrically connect the capacitive sensor to the circuit board.

In some example implementations, the electrical conductor 112 may comprise electrically conductive mechanisms including, but not limited to, a conductive wire, a standoff, or a spring. The electrical conductor may be configured to position the sensor pad of the capacitive sensor 108 in a spaced apart relation to the circuit board 110 and aligned with the fluid cup 200. Notably, the spaced apart relation or a distance between the circuit board and the sensor pad may affect a distance 114 that the sensor pad is separated from a top surface 116 of the fluid. Therefore, it may be advantageous to provide the electrical conductor with a distance between the circuit board and the sensor pad, which ensures that the distance that the sensor pad is separated from the top surface of the fluid is between about 0.5 mm to about 2.5 mm, and preferably between about 1.0 mm to about 2.0 mm. In this manner, the sensor pad of the capacitive sensor may be electrically connected to the circuit board and form with the fluid in the fluid cup elements of a capacitor 118.

In some example implementations, the capacitive sensor 108 may be aligned with the fluid cup 200. More particularly, the fluid cup is movably aligned with the capacitive sensor such that the capacitive sensor is a distance 114 separated from and in parallel with the top surface 116 of the fluid in the fluid cup. Where the fluid cup 200 is a fluid tray, for example, the capacitive sensor 108 may be aligned with a last fluid cup in the fluid tray, may be aligned with all fluid cups in the fluid tray, or may be moveably aligned with one or more fluid cups in the fluid tray.

In some example implementations, there may be more than one capacitive sensor 108 in the capacitive sensing system 100. For example, where the fluid cup 200 comprises a fluid tray having a plurality of fluid cups, each fluid cup may have a corresponding capacitive sensor aligned therewith such that the capacitive sensors may be arranged to correspond to the fluid cups in the fluid tray. In this example, where the tray is configured with two rows and twelve columns to form twenty four (24) individual fluid cups, there may be a corresponding twenty four (24) capacitive sensors arranged to be aligned simultaneously with the individual fluid cups in the fluid tray. Regardless, as fluid is received in the fluid cup, the distance 114 that the capacitive sensor is separated from the top surface 116 of the fluid is variable with the fill level 120 of the fluid in the fluid cup.

Notably, it may be advantageous to minimize the distance 114 that the capacitive sensor 108 is separated from the top surface 116 of the fluid in the fluid cup 200 in order to mitigate the influence of any external factors (e.g., noise created by other electrical circuits coupling to the capacitive sensing circuit) that may impact the sensitivity of the capacitive sensor. More particularly, moving the capacitive sensor close to the top surface of the fluid in the fluid cup improves sensitivity of the capacitive sensor and the signal to noise ratio. However, the capacitive sensor being too close to the top surface 116 of the fluid may result in other external factors impacting the sensitivity of the capacitive sensor, such as, for example, fluid splash during fluid fill. For example, the distance that the capacitive sensor may be separated from the top surface of the fluid in the fluid cup may be between about 0.5 millimeters (mm) to about 2.5 mm; and may be preferably about 1.0 mm to about 2.0 mm.

Each of the capacitive sensor 108 and the fluid in the fluid cup 200 may thus be configured such that when the two are aligned with one another, the respective surfaces (i.e., the top surface 116 of the fluid and a surface of the capacitive sensor facing the fluid) may be arranged to be in planes parallel to one another. As illustrated in FIGS. 1A and 1B, for example, the fluid cup is configured in a cubical shape such that the top surface of the fluid is a square planar surface in a first plane, while the capacitive sensor is configured in a square shape such that the surface facing the fluid is a square planar surface in a second plane. The fluid cup may then be movably aligned with the capacitive sensor such that the first plane and the second plane of the top surface of the fluid and the surface of the capacitive sensor, respectively, are parallel to one another. Accordingly, it may be desirable to align the top surface of the fluid in the fluid cup and the surface of the capacitive sensor 108 facing the fluid to be in substantially parallel planes.

In some other example implementations, the fluid cup 200 may comprise a non-cubical shape, such as for example, but not limited to, a conical shape, a cylindrical shape, a rectangular shape, and the like. The capacitive sensor 108 may comprise a non-square shape, such as a circular shape, a rectangular shape, etc. Accordingly, it may be desirable to form the fluid cup and the capacitive sensor such that the top surface 116 of the fluid in the fluid cup and the surface of the capacitive sensor facing the fluid are substantially a same shape and a same size, such that the top surface of the fluid in the fluid cup and the surface of the capacitive sensor facing the fluid have respective, matching surface areas or substantially matching surface areas (A).

In some example implementations, the fluid cup 200 and/or another element 202 of the capacitive sensing system 100 may be electrically connected to the circuit board 110. The other element of the capacitive sensing system may comprise at least, for example, a cooling block that cools the fluid received in the fluid cup to form a solid, stationary or twisting ice molds, and the like.

Figure 2:
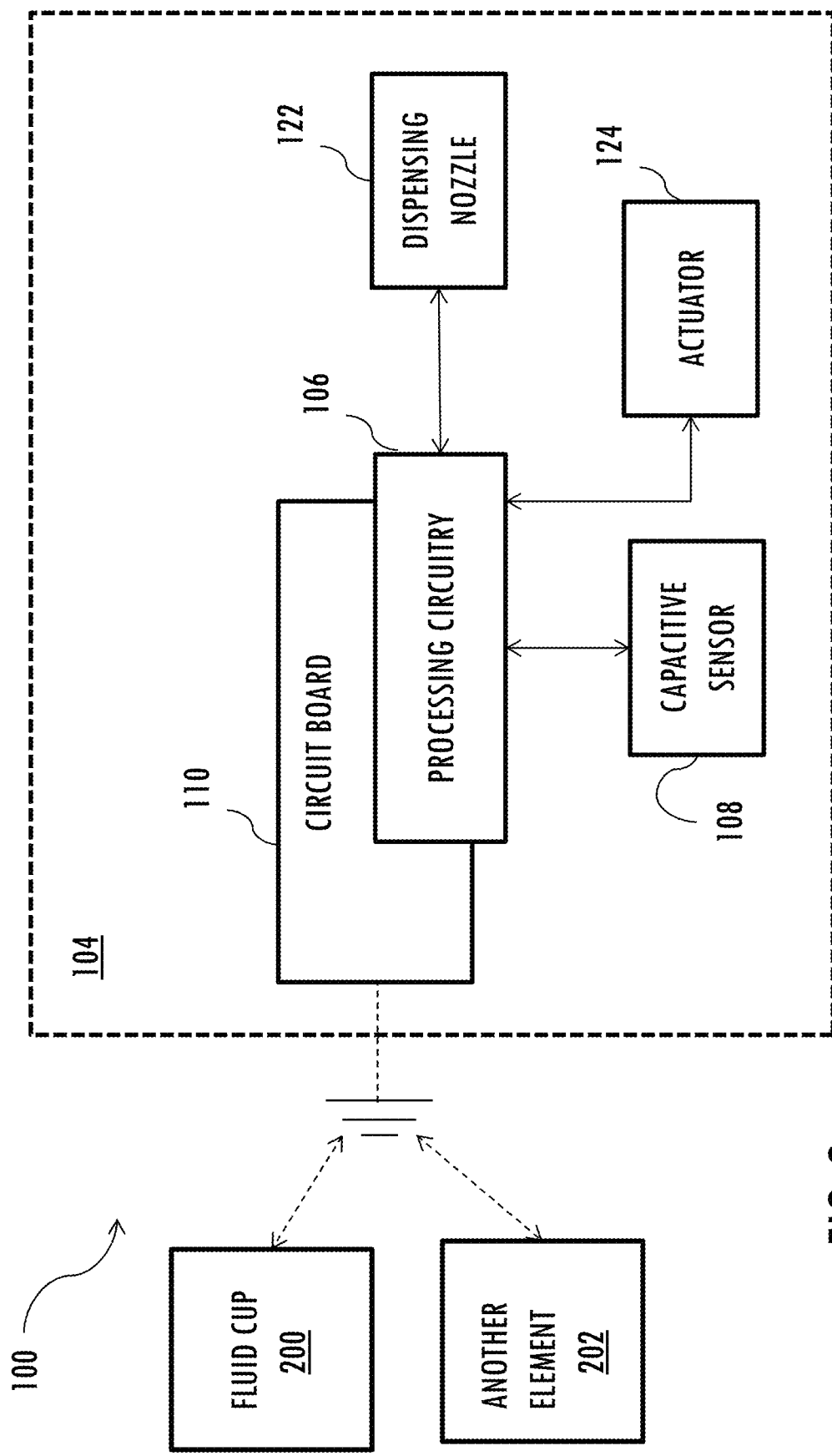
FIG. 2 illustrates an example schematic of processing circuitry according to example implementations of the present disclosure.

As illustrated in FIG. 2, the fluid cup 200 or the other element 202 may be made from a conductive material or have the conductive material affixed thereto, the conductive material being electrically connected to a circuit common on the circuit board to thereby ground the fluid cup or the other element of the capacitive sensing system. Alternatively, the fluid cup or the other element may be directly grounded.

Example conductive materials for the fluid cup 200 or the other element 202 may include metals, electrolytes, superconductors, semiconductors, plasmas, and conductive polymers. For example, the fluid cup or the other element may be made of copper or have copper (e.g., a copper tape) affixed thereto. Where the fluid cup or the other element comprises the conductive material affixed thereto, the conductive material may be provided on an external surface of the fluid cup or the other element, such as, for example, a bottom surface of the fluid cup or a side surface of the other element (e.g., a cooling block).

The capacitive sensor 108 in conjunction with the fluid in the fluid cup 200 is configured to form elements of a capacitor 118. In some example implementations, the capacitor so formed has a parasitic capacitance between the capacitive sensor 108 and a circuit common (e.g., ground) of the processing circuitry 106. The parasitic capacitance may be the baseline capacitance from which the change in signal is measured by the processing circuitry 106. The sensor pad of the capacitive sensor may form a first plate of the capacitor. The sensor pad may be provided on the circuit board 110 to form the first plate of the capacitor or the sensor pad may be separated from the circuit board via an electrical conductor 112 electrically connected to and between the sensor pad and the circuit board. One of the fluid cup or the other element 202 of the capacitive sensing system 100 may form a second plate of the capacitor, where one of the fluid cup or the other element is electrically connected to the circuit common on the circuit board.

For example, the fluid cup 200 may not be electrically connected to the circuit common on the circuit board so that external factors (e.g., the distance 114 of the sensor pad from a top surface of the fluid 116, a surface area (A) of the sensor pad, and a surface area (A) of the top surface of the fluid in the fluid cup) may impact the change in capacitance. More particularly, for example, where the fluid cup is not connected to the circuit common, another element (e.g., a cooling block) may form a parallel plate capacitor with the sensor pad. The sensor pad may be the first plate of the capacitor and the other element may be the second plate. The separation between the sensor pad and the other element may be the distance (d). The dielectric (E) in such an instance may be the dielectric material between the plates or the fluid in the fluid cup (e.g., water) and air. The surface area (A) may be the substantially similar or same surface areas of the sensor pad and the other element. In such an example implementation, a change in signal measured by the processing circuitry 106 as the fill level of the fluid in the fluid cup changes may be about, for example, between about 0.5 percent (%) and about 1.5%; more particularly about 1%.

Otherwise, in another example, the fluid cup 200 may be electrically connected to the circuit common on the circuit board 110. In such an instance, the other element may not be connected to the circuit common. More particularly, for example, where the fluid cup is connected to the circuit common, the fluid cup may form a parallel plate capacitor with the sensor pad of the capacitive sensor 108. The sensor pad may be the first plate of the capacitor and the fluid cup may be the second plate. The separation between the sensor pad and the fluid cup may be the distance (d). The dielectric (E) in such an instance may be the dielectric material between the plates or the fluid in the fluid cup (e.g., water) and air. The surface area (A) may be the substantially similar or same surface areas of the sensor pad and the fluid cup. In such an example implementation, a change in signal measured by the processing circuitry 106 as the fill level of the fluid in the fluid cup changes may be increased (e.g., greater than about 5%) as compared to the change in signal measured when the fluid cup is not connected thereto.

In some other example implementations, the capacitor 118 so formed has a capacitance that is measured between the sensor pad of the capacitive sensor 108 acting as a receiving electrode and the fluid cup 200 or the other element 202 of the capacitive sensing system acting as a transmitting electrode. The separation between the sensor pad (i.e., receiving electrode) and the fluid cup or the other element (i.e., transmitting electrode) may be the distance (d). The dielectric (E) in such an instance may be the dielectric material between the receiving electrode and the transmitting electrode (e.g., water and/or air). The surface area (A) may be the substantially similar or same surface areas of the receiving electrode and the transmitting electrode.

As such, the capacitor 118 formed by the sensor pad of the capacitive sensor 108 and fluid cup 200 or the other element 202 may have a capacitance C (in farad (F)) as determined by EQUATION 1:

$$C = \frac{\varepsilon A}{d} \quad \text{EQUATION 1}$$

Accordingly, the surface area A and the separation between the sensor pad and the fluid cup or the other element d may not change, while the dielectric ε changes. As is known, the relative dielectric of water is greater than air. As the fill level 120 of the fluid increases, the dielectric also increases due to the increasing volume of fluid (e.g., water) relative to air, such that the separation between the top surface 116 of the fluid and the sensor pad 108 decreases. In this manner, the capacitance of the capacitor 118 is variable with a distance the sensor pad (e.g., the capacitive sensor) is separated between the top surface of the fluid, and thereby the fill level of the fluid cup; the change in capacitance increasing with an increasing fill level of fluid in the fluid cup.

Figure 3:
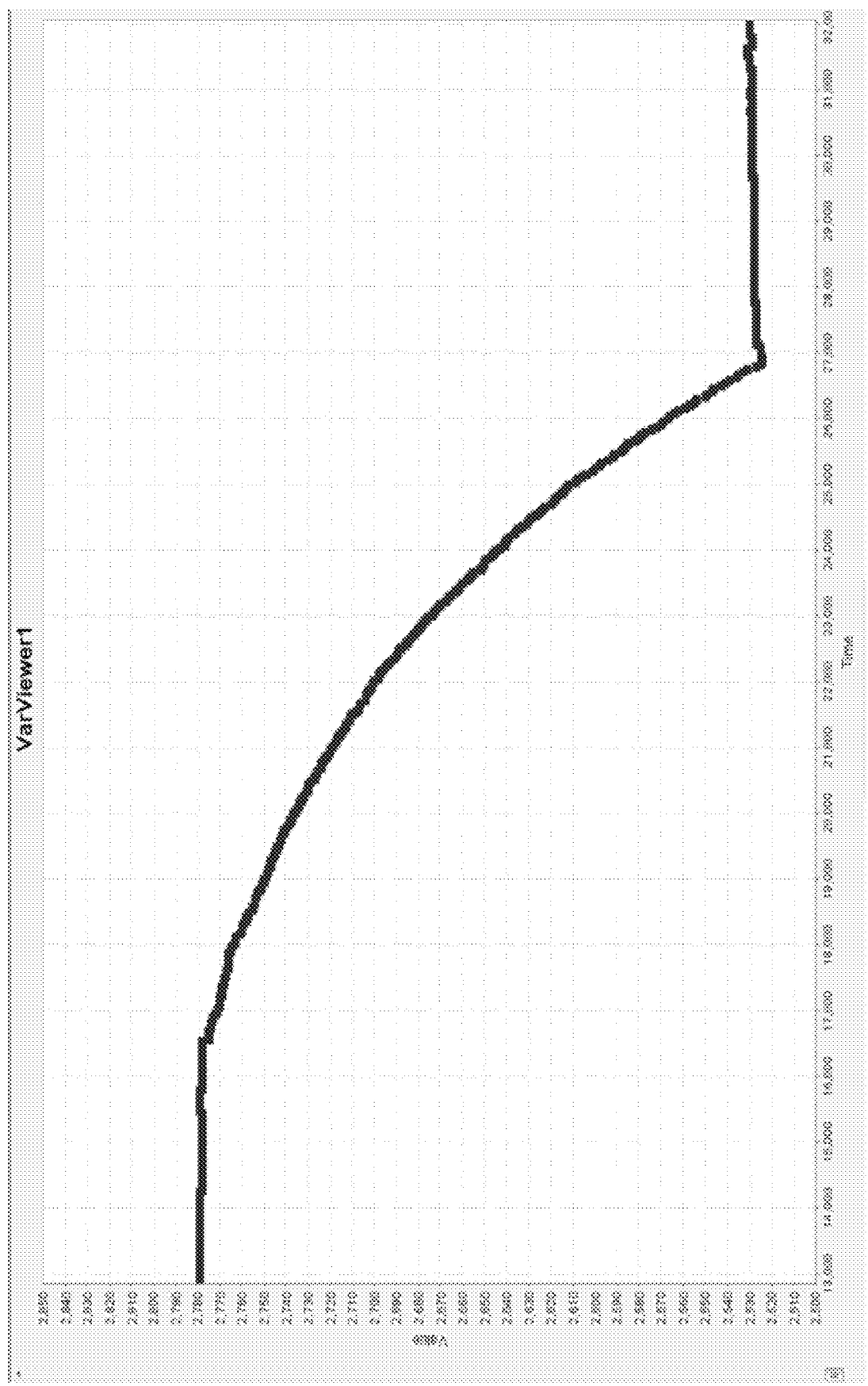
FIG. 3 illustrates an example graphical representation of a signal transmitted by a capacitive sensor of a capacitive sensing system as a fill level of fluid changes according to example implementations of the disclosure.

In some example implementations, the processing circuitry 106 is configured to measure a change in signal corresponding to a change in the capacitance of the capacitor as the fill level 120 of the fluid in the fluid cup changes. As illustrated in FIG. 3, an example of a change in signal as a fill level of fluid changes is illustrated. The signal may be the signal transmitted from the capacitor 118 to the processing circuitry that corresponds or is relative to the capacitance.

In this example, the processing circuitry 106 may establish a baseline value of the signal, which is based on environmental factors (e.g., parasitic capacitance). The baseline value may change over time to accommodate changes in environmental factors. Notably, changes in the baseline value may be much slower than signal changes caused by the fill level of fluid in the fluid cup. In some instances, the baseline value is the parasitic capacitance. In FIG. 3, the baseline value is about 2780 counts. The processing circuitry may then be configured to measure a change in signal from the baseline value. The change in signal corresponds to a change in capacitance of the capacitor 118 as the fill level 120 of the fluid in the fluid cup 200 changes. As illustrated in FIG. 3, as the fill level of the fluid in the fluid cup increases, the value of the signal decreases. However, other capacitive sensing circuits may produce a signal having a value that increases as the fill level of the fluid in the fluid cup increases.

Once the fill level 120 of the fluid in the fluid cup is at a predetermined threshold fill level then fluid fill ceases and the value of the signal may stabilize and be constant. As illustrated in FIG. 3, the value of the signal stabilizes at about 2525 counts. A magnitude of the change in signal is determined by measuring the change in signal between the baseline value and the constant value. Notably, the predetermined threshold fill level may be determined from experimentation, where a fluid cup is filled to a predetermined threshold fill level. An end signal value corresponding to the predetermined threshold fill value may be measured, such that the change in signal between the baseline value and the end signal value may be used to determine a predetermined threshold magnitude of the change in signal. As such, predetermined threshold magnitude of the change in signal may be used during subsequent fluid fills to determine when the fill level of the fluid in the fluid cup has reached the predetermined threshold fill value based on the magnitude of the change in signal.

In some example implementations, as noted above, the change in signal may be affected by whether or not the fluid cup 200 or the other element 202 is connected to the circuit common. In the example illustrated in FIG. 3, the fluid cup is grounded such that the change in signal is greater than if the fluid cup was not connected to the circuit common. In some example implementations, the processing circuitry 106 may be configured to determine the fill level of the fluid in the fluid cup at different time intervals until the predetermined threshold fill level 102 is achieved. More particularly, the processing circuitry 106 may be configured to constantly update the magnitude of the change in signal measured at different time intervals until the predetermined threshold magnitude of the change in signal that corresponds to the predetermined threshold fill level is achieved.

For example, where the magnitude of the change in signal is less than the predetermined threshold magnitude of the change in signal, the processing circuitry may determine that the predetermined threshold fill level has not been reached. In this example, the processing circuitry 106 may not stop fill of the fluid cup 200. In another example, where the magnitude of the change in signal is substantially the same as or the same as the predetermined threshold magnitude of the change in signal, the processing circuitry may determine that the predetermined threshold fill level has been reached. In this example, after reaching the predetermined threshold fill level, the processing circuitry may stop fill of the fluid cup. In a still further example, where the magnitude of the change in signal is greater than the predetermined threshold magnitude of the change in signal, the processing circuitry may determine that the predetermined threshold fill level has been exceeded. In this example, after reaching the predetermined threshold fill level, the processing circuitry may stop fill of the fluid cup and notify other peripheral systems that the fluid in the fluid cup has exceeded the predetermined threshold fill level. Such a notification may trigger the fluid cup to be marked in a solid-production system, for example, so that the fluid cup may be held in any solidification system (e.g., cooling block) longer in order to ensure that the fluid in the fluid cup solidifies.

In some example implementations, the system 100 may further comprise a dispensing nozzle 122 in a spaced apart relation to the capacitive sensor 108. For example, the dispensing nozzle may be spaced apart from the capacitive sensor by between about 2.5 mm and about 7 mm; and preferably about 5 mm, in order to prevent interference from the dispensing nozzle with the measuring of the change in capacitance. This may be desirable so that fluid dispensed from the dispensing nozzle does not interfere with the capacitive sensor and cause a premature determination that the fill level of the fluid has reached the predetermined threshold fill level.

The dispensing nozzle 122 may comprise, in some example implementations, a fluid output capable of dispensing the fluid into the fluid cup 200 up to the predetermined threshold fill level 102. The fluid cup may be moveably aligned with the dispensing nozzle such that when the fluid cup is moved into a dispensing position aligned with the output of the dispensing nozzle, the fluid may be dispensed from the dispensing nozzle into the fluid cup. A sensor (not shown) may be associated with the dispensing nozzle to output a signal upon sensing that the fluid cup is moved into the dispensing position.

In some example implementations, the dispensing nozzle 122 may be electrically connected or otherwise coupled to the processing circuitry 106 such that the processing circuitry may be configured to control actuation of the dispensing nozzle. For example, the processing circuitry may be configured to cause the dispensing nozzle to dispense the fluid into the fluid cup 200 until the processing circuitry measures the change in signal having a magnitude that is the same as a predetermined threshold magnitude of the change in signal, such that the fill level of the fluid in the fluid cup is at a predetermined threshold fill level. Accordingly, the dispensing nozzle 122 may be actuated upon receipt of the fluid cup within the dispensing position, to fill the fluid cup up to the predetermined threshold fill level.

In some further example implementations, an actuator 124 may be configured to move the fluid cup 200 out of alignment with the capacitive sensor 108 and the dispensing nozzle 122 and move a subsequent fluid cup into alignment with the capacitive sensor and the dispensing nozzle after the fill level of the fluid in the fluid cup is at the predetermined threshold fill level 102. The actuator may comprise an indexing mechanism configured to interact with and move individual fluid cups into and out of alignment with the dispensing nozzle (i.e., move the fluid cups out of the dispensing position and into the dispensing position). For example, the actuator may comprise a conveyor belt coupleable to each of the fluid cups to move the fluid cups in a machine direction. Alternatively, where the fluid cup comprises a fluid tray, for example, the dispensing nozzle 122 may be aligned with a last fluid cup in the fluid tray in order to dispense the fluid into the entirety of the fluid tray or may be alignable with each fluid cup in the fluid tray, such that the actuator indexes each fluid cup in the fluid tray into and out of alignment with the dispensing nozzle.

In FIG. 4, an example method 300 for capacitive sensing is provided. The method includes in some example implementations, moving a fluid cup into alignment with a capacitive sensor of a capacitive sensing circuit, in a first step 302.

The method 300 further includes, in some example implementations, receiving a fluid in the fluid cup such that the capacitive sensor is a distance separated from and in parallel with a top surface of the fluid in the fluid cup, the distance the capacitive sensor is separated from the top surface of the fluid being variable with a fill level of the fluid in the fluid cup, wherein the capacitive sensor and the fluid in the fluid cup form elements of a capacitor with a capacitance that is a function of at least the distance the capacitive sensor is separated from the top surface of the fluid, the capacitance being variable with the distance and thereby the fill level of the fluid in the fluid cup, in a second step 304.

The method 300 further includes, in some example implementations, measuring a change in signal corresponding to the change in capacitance of the capacitor as the fill level of the fluid in the fluid cup changes, in a third step 306.

The method 300 further includes, in some example implementations, determining the fill level of the fluid in the fluid cup based a magnitude of the change in signal, in a fourth step 308.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A capacitive sensing system comprising:
   a fluid cup configured to receive a fluid;
   a capacitive sensing circuit including processing circuitry and a capacitive sensor coupled to one another, the fluid cup being movably aligned with the capacitive sensor such that the capacitive sensor is a distance separated from and in parallel with a top surface of the fluid in the fluid cup, the distance the capacitive sensor is separated from the top surface of the fluid being variable with a fill level of the fluid in the fluid cup; and a dispensing nozzle in a spaced apart relation to the capacitive sensor, the fluid cup also being movably aligned with the dispensing nozzle that is configured to dispense the fluid into the fluid cup, wherein the capacitive sensor and the fluid in the fluid cup form elements of a capacitor with a capacitance that is a function of at least the distance the capacitive sensor is separated from the top surface of the fluid, the capacitance being variable with the distance and thereby the fill level of the fluid in the fluid cup, wherein the processing circuitry is configured to measure a change in signal corresponding to a change in capacitance of the capacitor as the fill level of the fluid in the fluid cup changes, and determine the fill level of the fluid in the fluid cup based on a magnitude of the change in signal.

2. The capacitive sensing system of claim 1, further comprising a circuit board on which the processing circuitry is provided.

3. The capacitive sensing system of claim 2, wherein the capacitive sensor comprises a sensor pad electrically coupled to the processing circuitry.

4. The capacitive sensing system of claim 3, further comprising an electrical conductor electrically connected to and between the sensor pad and the circuit board, the electrical conductor configured to position the sensor pad in a spaced apart relation to the circuit board and aligned with the fluid cup, the electrical conductor comprising a conductive wire, standoff or spring.

5. The capacitive sensing system of claim 3, wherein the fluid cup or another element of the capacitive sensing system is made from a conductive material or has the conductive material affixed thereto, the conductive material being electrically connected to a circuit common on the circuit board to thereby ground the fluid cup or the other element of the capacitive sensing system.

6. The capacitive sensing system of claim 5, wherein the sensor pad and the fluid cup or the other element of the capacitive sensing system form respective plates of the capacitor.

7. The capacitive sensing system of claim 5, wherein the sensor pad is provided on the circuit board to form one plate of the capacitor.

8. The capacitive sensing system of claim 5, wherein the other element of the capacitive sensing system comprises at least a cooling block made from the conductive material or having the conductive material affixed thereto.

9. The capacitive sensing system of claim 1, wherein the processing circuitry is configured to cause the dispensing nozzle to dispense the fluid into the fluid cup until the processing circuitry measures the change in signal having the magnitude of the change in signal that is the same as a predetermined threshold magnitude of the change in signal, such that the fill level of the fluid in the fluid cup is at a predetermined threshold fill level.

10. The capacitive sensing system of claim 9, further comprising an actuator configured to move the fluid cup out of alignment with the capacitive sensor and the dispensing nozzle and move a subsequent fluid cup into alignment with the capacitive sensor and the dispensing nozzle after the fill level of the fluid in the fluid cup is at the predetermined threshold fill level.

11. The capacitive sensing system of claim 1, wherein the capacitive sensor and the top surface of the fluid in the fluid cup have respective, matching surface areas.

12. A method for capacitive sensing comprising:

moving a fluid cup into alignment with a capacitive sensor of a capacitive sensing circuit and a dispensing nozzle in a spaced apart relation to the capacitive sensor;

dispensing a fluid from the dispensing nozzle into the fluid cup;

receiving the fluid in the fluid cup such that the capacitive sensor is a distance separated from and in parallel with a top surface of the fluid in the fluid cup, the distance the capacitive sensor is separated from the top surface of the fluid being variable with a fill level of the fluid in the fluid cup, wherein the capacitive sensor and the fluid in the fluid cup form elements of a capacitor with a capacitance that is a function of at least the distance the capacitive sensor is separated from the top surface of the fluid, the capacitance being variable with the distance and thereby the fill level of the fluid in the fluid cup;

measuring a change in signal corresponding to the change in capacitance of the capacitor as the fill level of the fluid in the fluid cup changes; and determining the fill level of the fluid in the fluid cup based on a magnitude of the change in signal.

13. The method of claim 12, wherein dispensing the fluid comprises the dispensing nozzle dispensing the fluid into the fluid cup until the change in signal is measured with the magnitude of the change in signal that is the same as a predetermined threshold magnitude of the change in signal, such that the fill level of the fluid in the fluid cup is at a predetermined threshold fill level.

14. The method of claim 13, further comprising moving the fluid cup out of alignment with the capacitive sensor and the dispensing nozzle and moving a subsequent fluid cup into alignment with the capacitive sensor and the dispensing nozzle after the fill level of the fluid in the fluid cup is at the predetermined threshold fill level.

* * * * *